United States Patent [19]

Sunagawa et al.

[11] Patent Number: 4,758,062
[45] Date of Patent: Jul. 19, 1988

[54] LIGHT BEAM SCANNING APPARATUS, AND READ-OUT APPARATUS AND RECORDING APPARATUS USING SAME

[75] Inventors: Hiroshi Sunagawa; Jin Murayama; Nobuharu Nozaki; Yoji Okazaki; Kozi Kamiyama; Chiaki Goto; Toshio Iijima, all of Kaisei, Japan

[73] Assignee: Fuji Photo Film Co., Ltd., Minamiashigara, Japan

[21] Appl. No.: 849,450

[22] Filed: Apr. 8, 1986

[30] Foreign Application Priority Data

| Apr. 8, 1985 | [JP] | Japan | 60-74061 |
| Apr. 8, 1985 | [JP] | Japan | 60-74062 |
| Apr. 8, 1985 | [JP] | Japan | 60-74063 |
| Oct. 8, 1985 | [JP] | Japan | 60-224181 |
| Oct. 11, 1985 | [JP] | Japan | 60-226059 |
| Oct. 14, 1985 | [JP] | Japan | 60-228058 |
| Oct. 14, 1985 | [JP] | Japan | 60-228059 |
| Oct. 14, 1985 | [JP] | Japan | 60-228060 |
| Oct. 16, 1985 | [JP] | Japan | 60-230290 |

[51] Int. Cl.$^4$ ............................................. G02B 6/34
[52] U.S. Cl. .............................. 350/96.19; 350/96.14
[58] Field of Search ............... 350/96.19, 96.29, 96.12, 350/96.13, 96.14

[56] References Cited

U.S. PATENT DOCUMENTS 4,571,024 2/1986 Husbands ..................... 350/96.19

Primary Examiner—William L. Sikes
Assistant Examiner—Robert E. Wise
Attorney, Agent, or Firm—Fleit, Jacobson, Cohn & Price

[57] ABSTRACT

A light beam scanning system comprises a stack of a wave guide layer and an adjacent layer normally exhibiting a refractive index smaller than that of the wave guide layer, the wave guide layer and/or the adjacent layer being made of a material whose refractive index changes by the application of energy. Many energy application devices are positioned at the wave guide layer and/or the adjacent layer along an optical path of wave guided inside of the wave guide layer. Dielectric gratings are positioned on the adjacent layer so as to correspond to sections where energy is applied. A drive circuit is provided for sequentially and selectively energizing the energy application devices, and changing the refractive index of the wave guide layer and/or the adjacent layer so that the guided wave is radiated out of the stack by interaction with the dielectric gratings at the sections where energy is applied.

31 Claims, 13 Drawing Sheets

F I G. 31
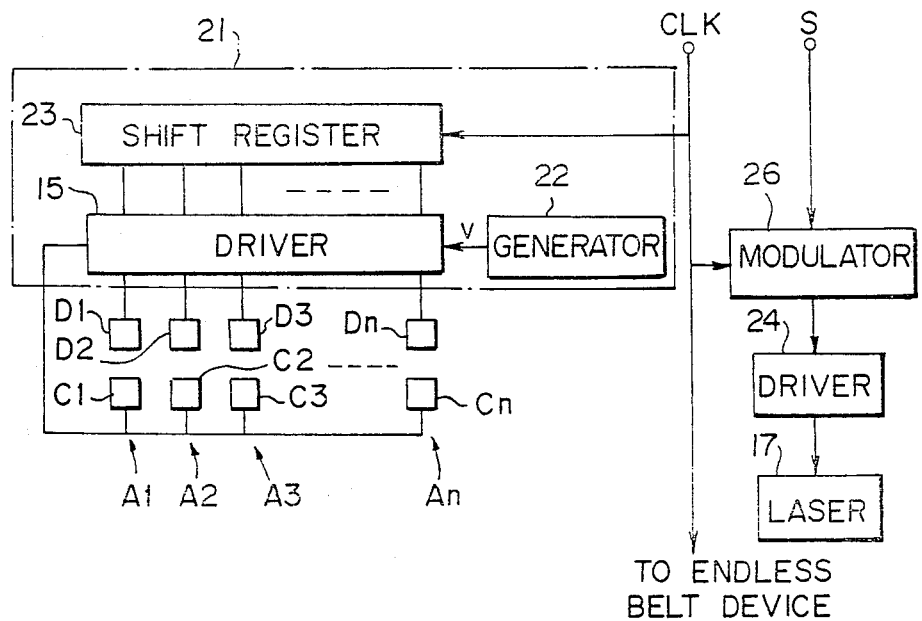
F I G. 32
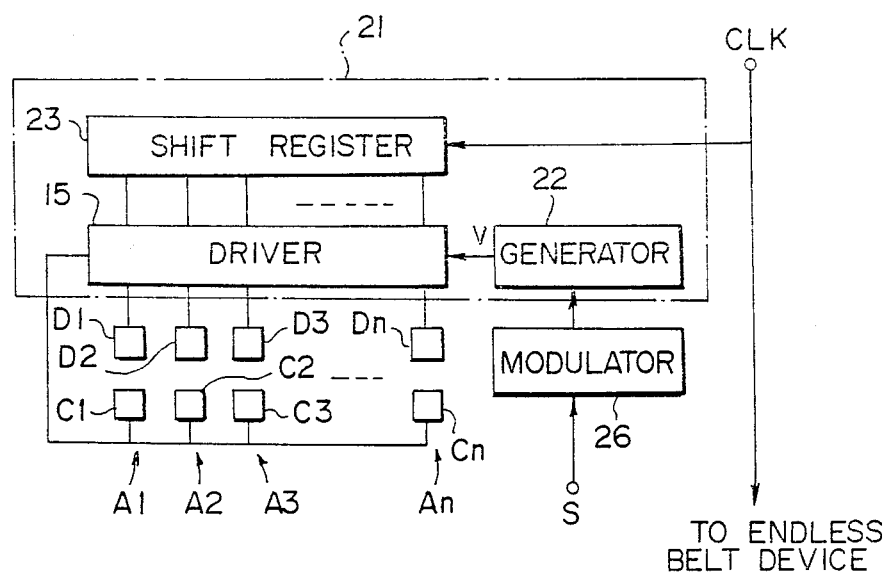

LIGHT BEAM SCANNING APPARATUS, AND READ-OUT APPARATUS AND RECORDING APPARATUS USING SAME

BACKGROUND OF THE INVENTION

1. Field of the Invention

This invention relates to a light beam scanning apparatus, a light beam scanning read-out apparatus, and a light beam scanning recording apparatus. This invention particularly relates to a light beam scanning apparatus, a light beam scanning read-out apparatus, and a light beam scanning recording apparatus wherein light beam scanning is conducted by use of a material whose refractive index changes by the application of an external field or energy (hereinafter generically referred to as "application of energy"), such as an electro-optic material.

2. Description of the Prior Art

Light beam scanning type recording apparatuses and read-out apparatuses have heretofore been used widely. As the light beam scanning apparatuses for one-dimensionally scanning a recording light beam or a reading light beam in the recording apparatuses and the read-out apparatus as, those as described below are known.

(1) Apparatuses wherein the light beam is deflected and scanned by a mechanical type light deflector such as a galvanometer mirror or a polygon mirror (multi-face rotating mirror).

(2) Apparatuses wherein the light beam is deflected and scanned by a light deflector using solid-state light deflecting device, such as an EOD (electro-optic deflector) or an AOD (acousto-optic deflector).

(3) Apparatuses wherein a shutter array such as a liquid crystal device array or a PLZT array is combined with a linear light source, the shutter devices of the shutter array are independently connected to drive circuits and turned on and off in accordance with an image signal to conduct linear sequential scanning.

(4) Apparatuses wherein many light emitting devices such as LEDs are arrayed in a line, independently connected to drive circuits, and turned on and off in accordance with an image signal to conduct linear sequential scanning.

The light beam scanning apparatuses described in (1) have the drawbacks that the mechanical type light deflector is weak against vibration, exhibits low mechanical durability, and requires troublesome adjustments. Further, a large optical system is necessary for swinging and deflecting the light beam, and the recording apparatuses and the read-out apparatuses become large.

The light beam scanning apparatuses described in (2) and using the EOD or AOD have the same drawback that the apparatuses become large to swing and deflect the light beam. Particularly, since the light deflection angle cannot be adjusted large with the EOD and AOD, the optical system becomes larger than in the case where the mechanical light deflector is used as described in (1).

In the light beam scanning apparatuses using the shutter array as described in (3), since two polarizing plates must be used, the light utilization efficiency of the light source is very low.

The light beam scanning apparatuses using many light emitting devices arrayed in a line as described in (4) have the drawback that, since fluctuations arise in light emission intensity between the light emitting devices, the apparatuses are not suitable for accurate scanning

SUMMARY OF THE INVENTION

The primary object of the present invention is to provide a light beam scanning apparatus which exhibits high durability, vibration resistance and light utilization efficiency, and which is easy to adjust, suitable for accurate scanning, and small in size.

Another object of the present invention is to provide a light beam scanning read-out apparatus which exhibits high durability, vibration resistance and light utilization efficiency, and which is easy to adjust, suitable for accurate scanning, and small in size.

A further object of the present invention is to provide a light beam scanning recording apparatus which exhibits high durability, vibration resistance and light utilization efficiency, and which is easy to adjust, suitable for accurate scanning, and small in size.

The present invention provides a light beam scanning apparatus which comprises:

(i) a stack of a wave guide layer and an adjacent layer normally exhibiting a refractive index smaller than the refractive index of said wave guide layer and closely contacted with said wave guide layer, at least either one of said wave guide layer and said adjacent layer being constituted by a material whose refractive index changes by the application of energy, (ii) a plurality of energy application means positioned at said wave guide layer and/or said adjacent layer along an optical path of wave guided inside of said wave guide layer, (iii) dielectric gratings positioned at the upper section of said adjacent layer at least over portions thereof corresponding to sections where energy is applied by said energy application means, and (iv) a drive circuit for sequentially and selectively energizing said plurality of energy application means to a predetermined energy application condition, and changing the refractive index of said wave guide layer and/or said adjacent layer so that said guided wave is radiated out of said stack by interaction with said dielectric gratings at said sections where energy is applied by said energy application means.

The present invention also provides a light beam scanning read-out apparatus which comprises:

(i) a stack of a wave guide layer and an adjacent layer normally exhibiting a refractive index smaller than the refractive index of said wave guide layer and closely contacted with said wave guide layer, at least either one of said wave guide layer and said adjacent layer being constituted by a material whose refractive index changes by the application of energy (ii) a plurality of energy application means positioned at said wave guide layer and/or said adjacent layer along an optical path of wave guided inside of said wave guide layer, (iii) dielectric gratings positioned at the upper section of said adjacent layer at least over portions thereof corresponding to sections where energy is applied by said energy application means, (iv) a light source for emitting light into said wave guide layer so that said wave advances along said arrayed sections where energy is applied by said energy application means, (v) a drive circuit for sequentially and selectively energizing said plurality of energy application means to a predetermined energy application condition, and changing the refractive index of said wave guide layer and/or said adjacent layer so that said guided wave is radiated out of said stack by interaction with said dielectric gratings at said sections where energy is applied by said energy application means, (vi) a sub-scanning means for moving a read-out original, which is positioned so that the light radiated out of said stack impinges thereupon, with respect to said stack in a direction approximately normal to the array direction of said sections where energy is applied by said energy application means, and (vii) a photodetector for photoelectrically detecting light transmitting through said original, light reflected by said original, or light emitted by said original when said light radiated out of said stack impinges upon said original.

The present invention further provides a light beam scanning recording apparatus which comprises:

(i) a stack of a wave guide layer and an adjacent layer normally exhibiting a refractive index smaller than the refractive index of said wave guide layer and closely contacted with said wave guide layer, at least either one of said wave guide layer and said adjacent layer being constituted by a material whose refractive index changes by the application of energy, (ii) a plurality of energy application means positioned at said wave guide layer and/or said adjacent layer along an optical path of wave guided inside of said wave guide layer, (iii) dielectric gratings positioned at the upper section of said adjacent layer at least over portions thereof corresponding to sections where energy is applied by said energy application means, (iv) a light source for emitting light into said wave guide layer so that said wave advances along said arrayed sections where energy is applied by said energy application means, (v) a drive circuit for sequentially and selectively energizing said plurality of energy application means to a predetermined energy application condition, and changing the refractive index of said wave guide layer and/or said adjacent layer so that said guided wave is radiated out of said stack by interaction with said dielectric gratings at said sections where energy is applied by said energy application means, (vi) a sub-scanning means for moving a light-sensitive material, which is positioned so that said light radiated out of said stack impinges thereupon, with respect to said stack in a direction approximately normal to the array direction of said sections where energy is applied by said energy application means, and (vii) a modulation means for modulating said light in accordance with an image signal.

As the material whose refractive index changes by the application of energy, it is possible to use an electro-optic material, a thermo-optic material whose refractive index changes with heat, an acoustooptic material whose refractive index changes with ultrasonic waves, a magneto-optic material whose refractive index changes with a magnetic field, or the like.

In the present invention, since a single light source is used, the problem of fluctuations in light emission intensity of the light source as in the case of the LED array or the like, and it is possible to conduct scanning accurately and to improve the light utilization efficiency of the light source. Further, since no mechanical operating section is used, the apparatus exhibits high durability and high resistance to vibration, and is easy to adjust.

Also, since scanning can be conducted without greatly swinging the light beam, it becomes possible to prevent the light beam scanning system from becoming large.

In the present invention, the refractive index $n_2$ of the wave guide layer and/or the refractive index $n_1$ of the adjacent layer, where $n_2 > n_1$ in the normal condition without application of energy, is changed so that the difference $n_2 - n_1$ becomes small or so that $n_2 \leq n_1$. The field distribution of the guided wave confined in the wave guide layer is thereby changed, and the guided wave is radiated out of the stack of the wave guide layer and the adjacent layer by the interaction with the dielectric grating and used as scanning light.

FIG. 1 is an explanatory view showing the light beam scanning in the apparatus of the present invention. For example, as shown in FIG. 1, the light beam scanning apparatus in accordance with the present invention comprises a substrate 10, a wave guide layer 11 overlaid on the substrate 10, and an adjacent layer 12 having dielectric gratings G and overlaid on the wave guide layer 11. By way of example, the adjacent layer 12 is constituted by an electro-optic material. The refractive index $n_3$ of the substrate 10, the refractive index $n_2$ of the wave guide layer 11, and the refractive index $n_1$ of the adjacent layer 12 when no electric field is applied satisfy the condition $n_2 > n_1, n_3$.

FIGS. 2A, 2B and 2C are graphs showing the dispersion curves in the apparatus shown in FIG. 1. In the configuration of FIG. 1, the dispersion curve when no electric field is applied is shown in FIG. 2A. In FIG. 2A, the ordinate axis denotes the effective refractive index, and the abscissa axis denotes the thickness of the wave guide layer 11. When the thickness of the wave guide layer 11 is T, the effective refractive index of the wave guide layer 11 is neff. At this time, the field distribution (electric field distribution) of the guided wave 14, for example, in the TE₀ mode, becomes as shown in FIG. 3A. As shown in FIG. 3A, though the guided wave slightly spreads to the adjacent layer 12 and the substrate 10, it does not interact with the dielectric grating G, and advances inside of the wave guide layer 11 without leaking out of the stack.

Then, an electric field is applied between electrodes of an electrode pair (not shown in FIG. 1) positioned on the adjacent layer 12 directly or via an intermediate layer. In this manner, the refractive index of the adjacent layer 12 at the section corresponding to the space P between the electrodes is increased from $n_1$ to $n_1 + \Delta n$. At this time, the dispersion curve becomes as indicated by the chain line in FIG. 2B, and the effective refractive index neff of the wave guide layer 11 increases to n'eff. In this case, the electric field distribution of the guided wave changes as shown in FIG. 3B. Namely, the guided wave spreading to the adjacent layer 12 increases to an extent sufficiently interacting with the dielectric grating G. As a result, the spreading light indicated by hatching in FIG. 3B is radiated and advances upwardly (or downwardly or upwardly and downwardly, depending on the type of the dielectric grating G, and ultimately almost all of the guided wave is radiated out of the stack.

Also, in the configuration of FIG. 1, when the refractive index of the adjacent layer 12 is changed from $n_1$ to $n_1 + \Delta n''$ which is nearly equal to the effective refractive index n"eff of the wave guide layer 11 changing as the refractive index of the adjacent layer 12 is changed, the dispersion curve becomes as indicated by the chain line in FIG. 2C, and the guided wave changes from the guided mode to the radiation mode and shifts to the adjacent layer 12. In this case, the electric field distribution of the guided wave changes as shown in FIG. 3C. Namely, the guided wave leaks to the adjacent layer 12, is radiated and advances upwardly (and/or downwardly) by the interaction with the dielectric grating G, and is quickly radiated out of the stack. Also, by changing the refractive index n1 of the adjacent layer 12 to a value approximately equal to or larger than the refractive index n2 of the wave guide layer 11, it is possible to change the total reflection conditions of the wave guided inside of the wave guide layer 11, thereby shifting the guided wave to the adjacent layer 12, and to radiate it out of the stack by the interaction with the dielectric grating G. In this manner, the guided wave can be radiated out of the stack at the section where the electric field is applied. Therefore, when a plurality of the electrode pairs are positioned so that the electrode space P extends in a line along the adjacent layer 12, and an electric field is applied sequentially and selectively to the electrode pairs, light is radiated sequentially from different positions of the adjacent layer 12, and light beam scanning is effected.

Instead of constituting the adjacent layer 12 by use of the electro-optic material and changing its refractive index, it is also possible to constitute the wave guide layer 11 by use of an electro-optic material, to position the electrode pairs at the wave guide layer 11, and to change (decrease) the refractive index of the wave guide layer 11. Or, both of the wave guide layer 11 and the adjacent layer 12 may be constituted by use of an electro-optic material and provided with electrode pairs, and the refractive indexes of the wave guide layer 11 and the adjacent layer 12 may be changed.

Further, when the dielectric grating G is formed as a converging dielectric grating, the light radiated out of the stack converges to a single point, and it becomes possible to prevent light dissipation.

BRIEF DESCRIPTION OF THE DRAWINGS

FIG. 31 is a block diagram showing the electric circuit in an embodiment of the light beam scanning recording apparatus in accordance with the present invention, and FIG. 32 is a block diagram showing the electric circuit in another embodiment of the light beam scanning recording apparatus in accordance with the present invention.

DESCRIPTION OF THE PREFERRED EMBODIMENTS

The present invention will hereinbelow be described in further detail with reference to the accompanying drawings.

Figure 1:
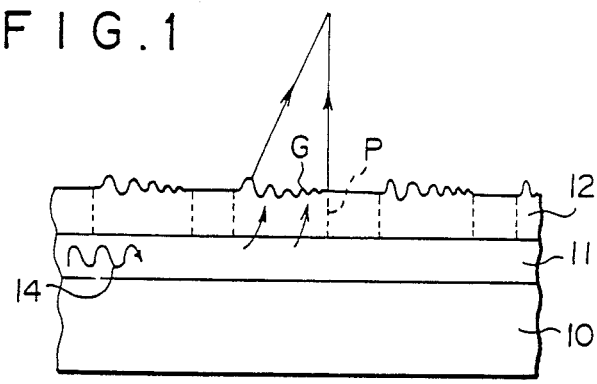
FIG. 1 is an explanatory view showing the light beam scanning in the apparatus in accordance with the present invention.
Figure 2A:
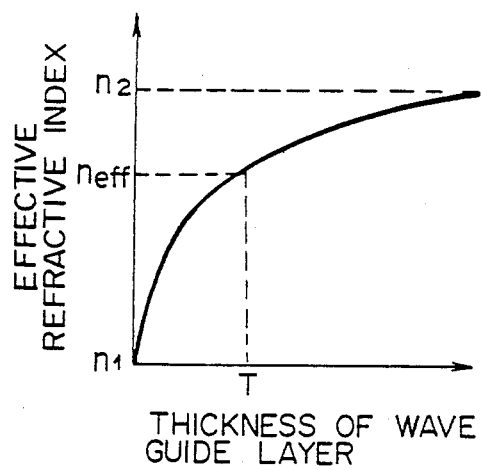
FIGS. 2A, 2B and 2C are graphs showing the dispersion curves in the apparatus of FIG. 1, FIGS. 3A, 3B and 3C are schematic views showing the electric field distribution of guided wave in the apparatus of FIG. 1.
Figure 2B:
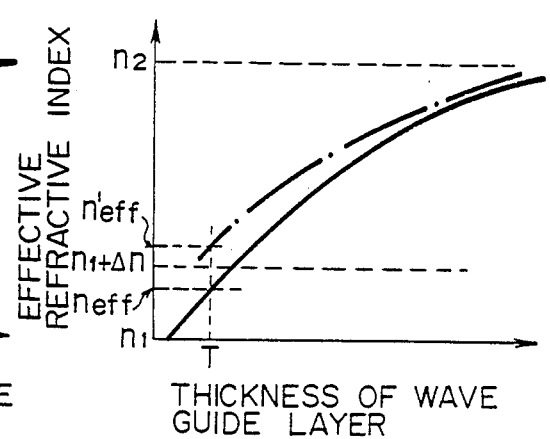
Figure 2C:
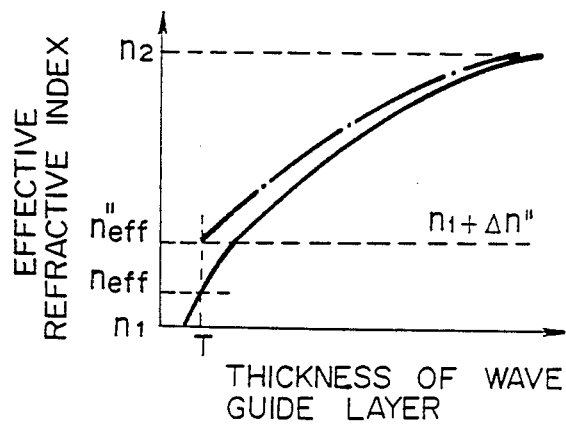
Figure 3A:
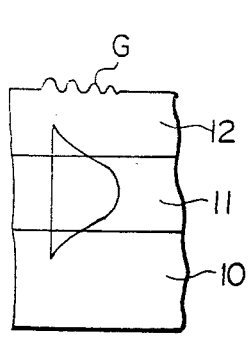
Figure 3B:
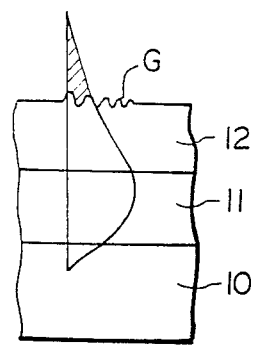
Figure 3C:
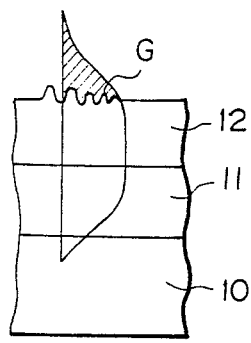
Figure 4:
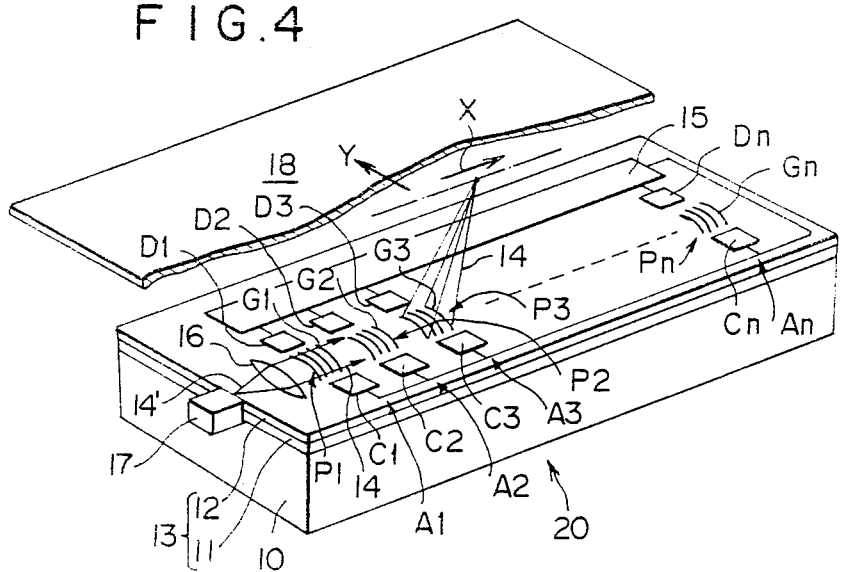
FIG. 4 is a perspective view showing an embodiment of the light beam scanning apparatus in accordance with the present invention.

Referring to FIG. 4, a light beam scanning apparatus 20 comprises a substrate 10, and a stack 13 positioned on the substrate 10. The stack 13 is constituted by a wave guide layer 11 and an adjacent layer 12 closely contacted with the wave guide layer 11. By way of example, the adjacent layer 12 is formed of an electro-optic material. The wave guide layer 11, the adjacent layer 12 and the substrate 10 are constituted by materials satisfying the condition $n2 > n1$, $n3$ where $n2$ and $n3$ respectively denote the refractive indexes of the wave guide layer 11 and the substrate 10, and $n1$ denotes the refractive index when no electric field is applied, so that wave may advance inside of the wave guide layer 11. The combination of the materials of the wave guide layer 11, the adjacent layer 12 and the substrate 10 may be [$Nb_2O_5$:$K_3Li_2Nb_5O_{15}$:glass], [$Nb_2O_5$:$LiNbO_3$:glass], or the like. The wave guide configuration is described in detail, for example, in T. Tamir, "Integrated Optics,"

Topics in Applied Physics, Vol. 7, Springer-Verlag, 1975, and Nishibara, et al., "Integrated Optical Circuit", Ohm, 1985. In the present invention, any of the known wave guide configurations may be used as the combination of the wave guide layer 11, the adjacent layer 12 and the substrate 10. By way of example, the thickness of the wave guide layer 11 may be within the range of 0.5 $\mu$m to 10 $\mu$m, the thickness of the adjacent layer 12 may be within the range of 1 $\mu$m to 50 $\mu$m, and the thickness of the substrate may be 1 $\mu$m or larger.

The adjacent layer 12 is provided with electrode pairs A1, A2, A3, ..., An which respectively comprise common electrodes C1, C2, C3, ..., Cn and individual electrodes D1, D2, D3, ..., Dn, and which are arrayed so that electrode spaces P1, P2, P3, ..., Pn extend in a line along the adjacent layer 12. The common electrodes C1, C2, C3, ..., Cn and the individual electrodes D1, D2, D3, Dn are formed so that the electrode width is within the range of approximately 10 $\mu$m to 200 $\mu$m and the distance between the common and indivsual electrodes is within the range of approximately 10 $\mu$m to 5 mm, i.e. so that the area of each of the electrode spaces P1, P2, P3, ..., Pn is within the range of approximately 10×10 $\mu$m to 0.2×5 mm. The electrode spaces P1, P2, P3, ..., Pn are arrayed so that the distance therebetween is within the range of approximately 100 $\mu$m to 200 $\mu$m. The common electrodes C1, C2, C3, ..., Cn and the individual electrodes D1, D2, D3, ..., Dn are connected to a driver 15 positioned on the substrate 10. However, the driver 15 may be positioned independently of the substrate 10. Dielectric gratings G1, G2, G3, ..., Gn are formed on the surface of the adjacent layer 12 at positions facing the electrode spaces P1, P2, P3, ..., Pn.

The wave guide layer 11 is provided with a wave guide lens 16 at the extension of the array of the electrode spaces P1, P2, P3, ..., Pn. The substrate 10 is provided with a semiconductor laser 17 for emitting a laser beam 14' toward the wave guide lens 16 in the wave guide layer 11.

Figure 5:
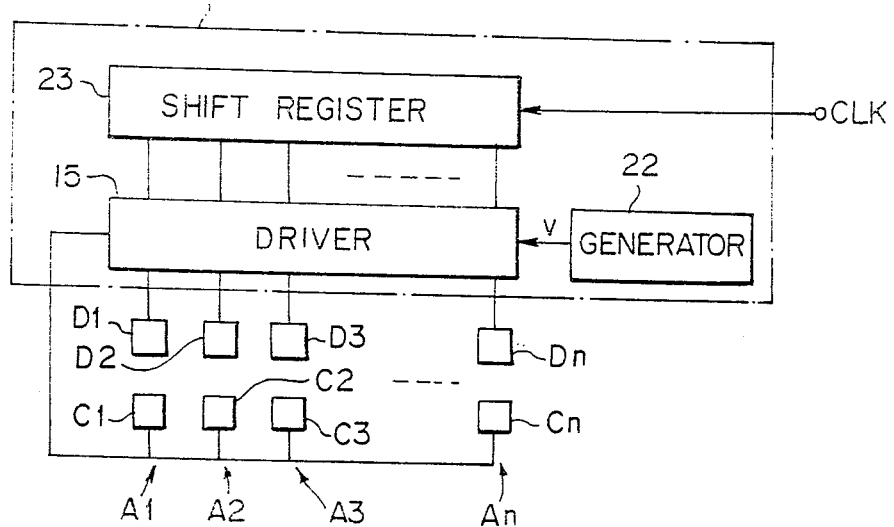
FIG. 5 is a block diagram showing the electric circuit in the embodiment of FIG. 4, FIGS. 6 and 7 are sectional side views showing further embodiments of the light beam scanning apparatus in accordance with the present invention.

FIG. 5 shows a drive circuit 21 of the light beam scanning apparatus 20. The operations of the light beam scanning apparatus 20 will hereinbelow be described with reference to FIGS. 4 and 5. First, the semiconductor laser 17 is activated, and the laser beam 14' is emitted thereby to the inside of the wave guide layer 11. The laser beam 14' is converted by the wave guide lens 16 into a laser beam 14 of parallel rays which advance inside of the wave guide layer 11 in the array direction of the electrode spaces P1, P2, P3, ..., Pn as shown in FIG. 4. A voltage V generated by a voltage generating circuit 22 is applied between the common electrodes C1, C2, C3, Cn and the individual electrodes D1, D2, D3, ..., Dn via the driver 15. The driver 15 receives the output of a shift register 23 operated in synchronization with a clock signal CLK, and is activated thereby to sequentially select the individual electrodes D1, D2, D3, ..., Dn and applies the voltage V between the selected individual electrode and the corresponding common electrode. Specifically, the voltage V is applied first between the first individual electrode D1 among the individual electrodes D1, D2, D3, ..., Dn and the first common electrode C1 among the common electrodes C1, C2, C3, ..., Cn, then between the second individual electrode D2 and the second common electrode C2, and so on. When the voltage V is applied sequentially between the electrodes of electrode pairs A1, A2, A3, ..., An, and an electric field is applied sequentially to the electrode spaces P1, P2, P3, ..., Pn, the refractive index of the adjacent layer 12 at which the electric field is applied increases. As a result, the laser beam 14 is radiated from the wave guide layer 11 to the adjacent layer 12 sequentially at the sections corresponding to the electrode spaces P1, P2, P3, ..., Pn, and is radiated out of the adjacent layer 12 by the diffracting action of the dielectric gratings G1, G2, G3, ..., Gn. Thus the position of radiation of the laser beam 14 from the adjacent layer 12 sequentially changes from the dielectric grating G1 to the dielectric grating G2, ..., to the dielectric grating Gn, and then to the dielectric grating G1, and so on. Therefore, a scanning material 18 is scanned by the radiated laser beam 14 in the main scanning direction as indicated by the arrow X in FIG. 4. [Application of the voltage V to the electrode pairs A1, A2, A3, ..., An may also be controlled so that the position of radiation of the laser beam 14 changes like dielectric grating G1→G2→. . . Gn→G(n−1)→G(n−2) . . . ]While the scanning material 18 is scanned in the main scanning direction, it is moved in the sub-scanning direction as indicated by the arrow Y in FIG. 4 in synchronization with the scanning in the main scanning direction by the clock signal CLK. In this manner, the scanning material 18 is scanned in two directions.

In the embodiment of FIG. 4, the dielectric gratings G1, G2, G3, ..., Gn positioned on the surface ofthe adjacent layer 12 are fabricated as converging dielectric gratings, and the laser beam 14 radiated from the dielectric gratings G1, G2, G3, ..., Gn is converged to a single point on the scanning material 18. The converging dielectric grating is formed by positioning grid patterns like a curve of second order in the advance direction of the laser beam 14 inside of the wave guide layer 11, and changing the curvature of each pattern and the pattern pitch so that the converging action is obtained. The converging dielectric grating is described in detail, for example, in Technical Research Report OQC83-84, The Institute of Electronics and Communication Engineers of Japan, pages 47 to 54.

Also, instead of directly coupling the semiconductor laser 17 with the wave guide layer 11, the laser beam may be made to impinge upon the wave guide layer 11 via a lens, a coupler prism, a grating coupler or the like. The semiconductor laser 17 may also be formed integrally with the wave guide layer 11 when the wave guide layer 11 is formed. The light source for emitting the scanning light is not limited to the semiconductor laser 17, and may be a gas laser, a solid laser or the like.

Figure 6:
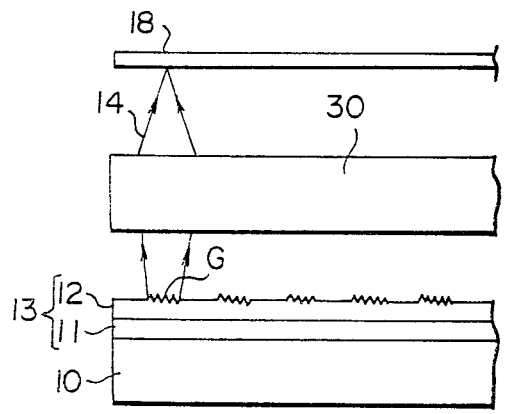
Figure 7:
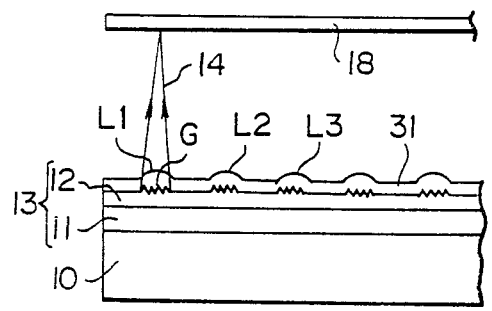

Further, in order to converge the laser beam 14 radiated from the adjacent layer 12 to a single point, instead of forming the dielectric gratings G1, G2, G3, ..., Gn as the converging diejectric gratings, a lens array 30 constituted by a SELFOC lens array or the like may be positioned between the light beam scanning apparatus 20 and the scanning material 18 as shown in FIG. 6. Further, as shown in FIG. 7, a lens array layer 31 comprising lenses L1, L2, L3, ..., Ln may be positioned on the adjacent layer 12 so that the lenses correspond to the positions of the electrode spaces P1, P2, P3, ..., Pn. In this case, the lenses L1 to Ln may be formed as ordinary convex lenses as shown in FIG. 7, or as distributed index lenses constituted by distributing the refractive index of the array layer material. Also, the laser beam 14 may be converged by both of the lens array 30 or the lens array layer 31 and the converging dielectric gratings. However, only the converging dielectric gratings should preferably be used for simplifying the configuration of the light beam scanning apparatus. The laser beam 14 radiated from the adjacent layer 12 need not necessarily be converged as described above, and the scanning material 18 may be scanned by parallel rays or divergent rays.

In the aforesaid embodiments, the stack 13 of the wave guide layer 11 and the adjacent layer 12 is positioned on the substrate 10. However, the substrate 10 may be omitted, and the wave guide layer 11 may directly contact ambient atmosphere. Or, the adjacent layer 12 may be overlaid on the two surfaces of the wave guide layer 11, the scanning light may be radiated to the upper and lower sides of the wave guide layer 11, and two scanning surfaces may be scanned by the scanning light at the same time.

The light beam scanning apparatus of the present invention may also be constituted so that the energy application sections like the electrode spaces P1, P2, P3, ..., Pn are arrayed in two or more lines.

FIGS. 8 to 11 show the major parts of still further embodiments of the light beam scanning apparatus in accordance with the present invention, wherein the end face of the wave guide layer 11 opposite to the input face thereof is subjected to a return light generation preventing processing.

Figure 8:
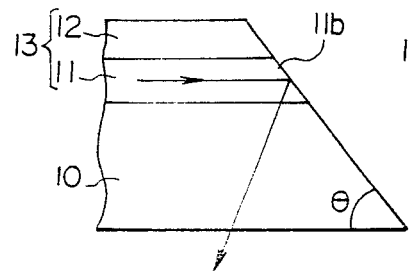
FIGS. 8 to 11 are side views showing the major parts of still further embodiments of the light beam scanning apparatus in accordance with the present invention.

In FIG. 8, an end face 11b opposite to the input face of the wave guide layer 11 is cut obliquely so that the laser beam 14 guided inside of the wave guide layer 11 is reflected downwardly by the end face 11b, impinges upon the substrate 10 at a relatively small angle of incidence, and is radiated out of the substrate 10. Since total reflection does not arise at the boundary between the wave guide layer 11 and the substrate 10, the laser beam 14 reflected by the end face 11b does not return inside of the wave guide layer 11 toward the input face thereof.

Accordingly, no multiple reflection arises between the laser beam 14 emitted by the semiconductor laser 17 as shown in FIG. 4 and guided inside of the wave guide layer 11 and a return laser beam, and no noise is generated by the multiple reflection in the scanning laser beam 14 radiated out of the stack 13. Further, generation of noise in the semiconductor laser 17 by such return laser beam is prevented, and the service life of the semiconductor laser 17 becomes long since there is no risk of the semiconductor laser 17 damaged by the return laser beam.

Though the total reflection conditions at the boundary between the wave guide layer 11 and the substrate 10 are different in accordance with the configuration (refractive index and thickness) of the wave guide layer 11, the refractive index of the substrate 10, the order of guided mode, or the like, the oblique cutting angle $\theta$ of the end face 11b as shown in FIG. 8 may generally be adjusted to approximately 45°.

Figure 9:
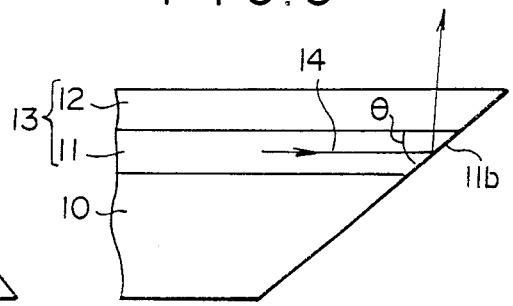

In the embodiment of FIG. 9, the end face 11b of the wave guide layer 11 is obliquely cut in the direction opposite to that in FIG. 8. In this case, since the laser beam 14 reflected by the end face 11b advances in the same direction as the scanning laser beam, the cutting angle $\theta$ should be adjusted so that the reflected laser beam 14 does not impinge upon the scanning material 18 shown in FIG. 4, or a light shielding material should be positioned between the scanning material 18 and the wave guide layer 11.

Figure 10:
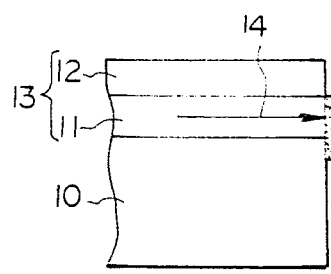
Figure 11:
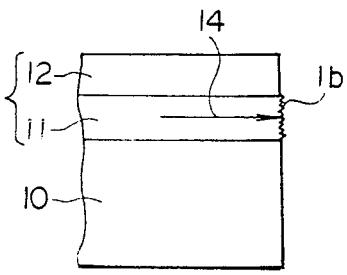

Generation of return wave may also be prevented by securing a light absorbing material 70 to the end face 11b as shown in FIG. 10, by coating a light reflection preventing layer on the end face 11b, or by roughing the end face 11b as shown in FIG. 11 so that the guided wave is scattered at the end face 11b.

Figure 12:
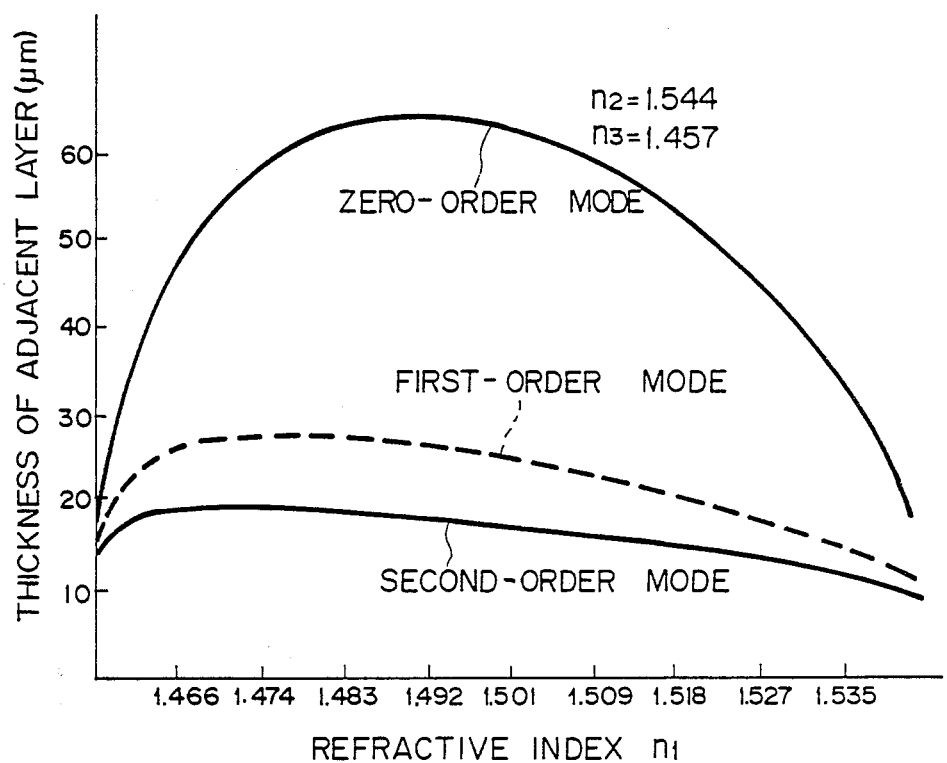
FIG. 12 is a graph showing the relationship between the refractive index of the adjacent layer in the apparatus in accordance with the present invention and the thickness thereof in the guided mode.
Figure 13:
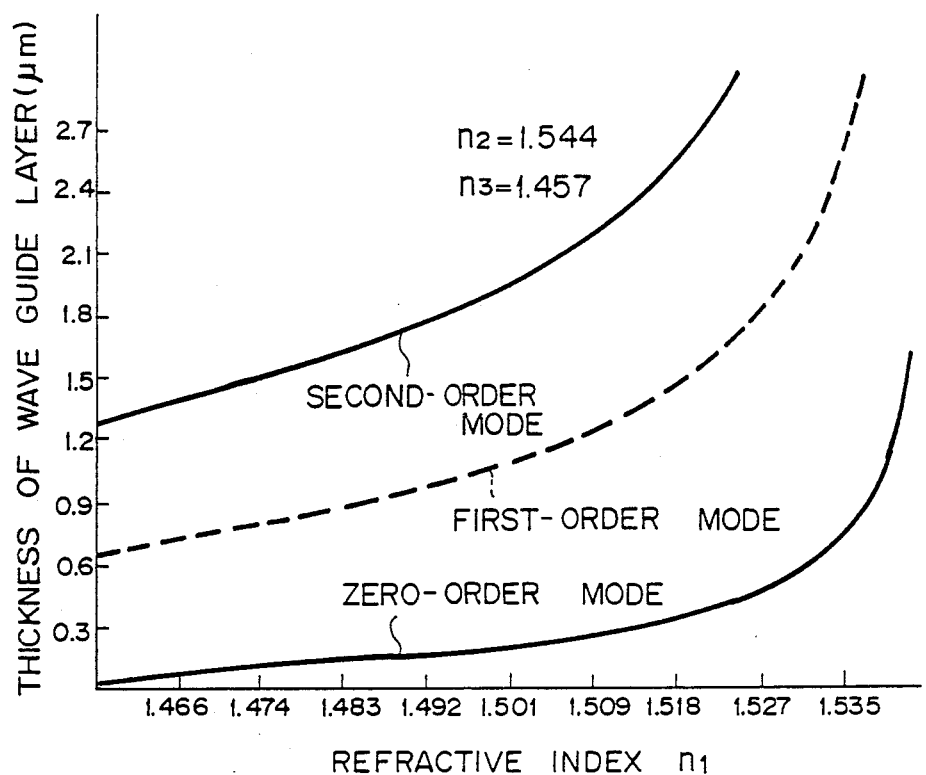
FIG. 13 is a graph showing the relationship between the refractive index of the adjacent layer in the apparatus in accordance with the present invention and the thickness of the wave guide layer in the guided mode.

A further embodiment of the light beam scanning apparatus in accordance with the present invention, wherein the guided mode of the guided wave is adjusted to first-order or higher-order mode, will hereinbelow be described with reference to FIGS. 12 and 13. In this embodiment, the semiconductor laser 17 shown in FIG. 4 is coupled with the wave guide layer 11 so that the laser beam 14 is guided inside of the wave guide layer 11, for example, in the first-order mode. FIGS. 12 and 13 respectively show the relationship between the refractive index n1 and the thickness of the adjacent layer 12, and the relationship between the refractive index n1 of the adjacent layer 12 and the thickness of the wave guide layer 11 in various orders of guided modes when the refractive index n2 is 1.544 and the refractive index n3 is 1.457. As clear from FIGS. 12 and 13, when the refractive index n1 is, for example, 1.518, the thickness of the adjacent layer 12 is approximately 55 $\mu$m and the thickness of the wave guide layer 11 is approximately 0.4 $\mu$m in the zero-order mode. In the first-order mode, the thickness of the adjacent layer 12 is approximately 22 $\mu$m, and the thickness of the wave guide layer 11 is approximately 1.5 $\mu$m. Thus the thickness of the adjacent layer 12 in the first-order guided mode is less than half the thickness thereof in the zero-order guided mode. Further, the ratio of the thickness of the adjacent layer 12 to the thickness of the wave guide layer 11 is approximately 138 (=55/0.4) in the zero-order mode, and is approximately 15 (=22/1.5) in the first-order mode.

In the embodiment wherein the guided mode is adjusted to the first-order mode, since the thickness of the adjacent layer 12 becomes sufficiently smaller than that in the case where the guided mode is the zero- order mode, formation of the adjacent layer 12 by sputtering or the like becomes easy. Further, since the difference between the thickness of the wave guide layer 11 and the thickness of the adjacent layer 12 becomes very small, it is possible to eliminate the problem that formation of the layers becomes difficult due to a difference in thermal expansion between the wave guide layer 11 and the adjacent layer 12.

In this embodiment, the order of the guided mode is not limited to the first order, and the aforesaid effects are obtained when the guided mode order is first or higher order (i.e. other than the zero order). As clear from FIGS. 12 and 13, larger effects are obtained as the order of the guided mode is higher.

Also, since the interaction between the dielectric gratings G1, G2, G3, ..., Gn and the guided laser beam 14 increases as the order of the guided mode is higher, the guided wave take-up efficiency from the stack 13 is improved.

Still further embodiments of the light beam scanning apparatus in accordance with the present invention will hereinbelow be described with reference to FIGS. 14 to 18. In these embodiments, the wave guide layer and/or the adjacent layer is made of an electro-optic material, the electrode pairs are constituted by transparent electrodes positioned on the outer surface of the adjacent layer along the optical path of the wave guided inside of the wave guide layer, and an electrode positioned on the outer surface of the wave guide layer to face the transparent electrodes, and the dielectric gratings are positioned on the surfaces of the transparent electrodes.

Figure 14:
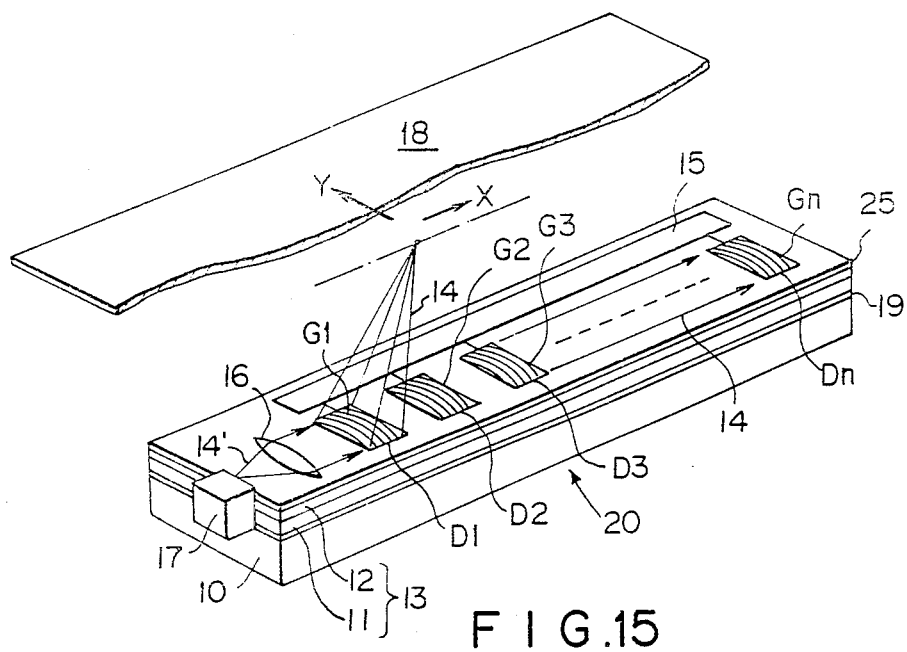
FIG. 14 is a perspective view showing a still further embodiment of the light beam scanning apparatus in accordance with the present invention.
Figure 15:
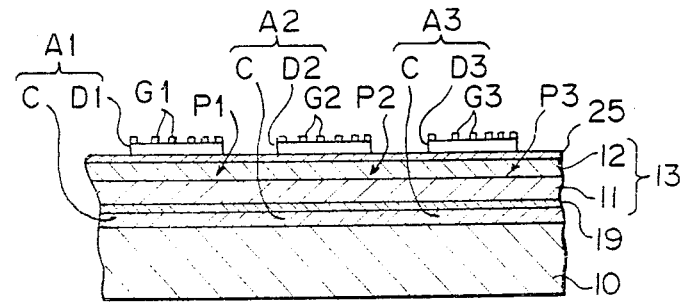
FIG. 15 is a sectional side view showing the major part of the embodiment of FIG. 14.

In FIGS. 14 and 15, the light beam scanning apparatus 20 comprises a stack 13 of the substrate 10, the wave guide layer 11 overlaid on the substrate 10 via an insulating layer 19, and the adjacent layer 12 closely contacted with the wave guide layer 11 and made of an electro-optic material. The wave guide layer 11, the adjacent layer 12, and the insulating layer 19 are constituted by materials satisfying the condition n2>n1, n3 as described above, except that n3 denotes the refractive index of the insulating layer 19, instead of the refractive index of the substrate 10. By way of example, thicknesses of the wave guide layer 11, the adjacent layer 12, and the insulating layer 19 are respectively within the ranges of 0.5 μm to 10 μm, 1 μm to 50 μm, and 1 μm to 50 μm.

Transparent individual electrodes D1, D2, D3, ..., Dn are arrayed in a line on the outer surface of the adjacent layer 12, i.e. the surface thereof opposite to the wave guide layer 11, via an insulating layer 25. The dielectric gratings G1, G2, G3, ..., Gn are respectively positioned on the surfaces of the individual electrodes D1, D2, D3, ..., Dn. Or, the dielectric gratings G1, G2, G3, ..., Gn may be fabricated of a transparent material and secured to the individual electrodes D1, D2, D3, ..., Dn. A common electrode C is positioned on the outer surface of the wave guide layer 11, i.e. the surface thereof opposite to the adjacent layer 12, via the insulating layer 19 so as to face the individual electrodes D1, D2, D3, ..., Dn. Though the insulating layers 25 and 19 may be omitted by fabricating the adjacent layer 12 and the wave guide layer 11 respectively by use of an insulating material, the insulating layers 25 and 19 should preferably be provided. Particularly, the insulating layer 19 should be formed for preventing light power attenuation arising when the common electrode C is directly positioned on the outer surface of the wave guide layer 11. When the insulating layer 19 is omitted, the layer materials should be selected to satisfy the condition n2>n1, n3 where n2 and n3 respectively denote the refractive indexes of the wave guide layer 11 and the substrate 10, and n1 denotes the refractive index when no electric field is applied.

Since the individual electrodes D1, D2, D3, ..., Dn and the common electrode C are positioned as described above, as shown in FIG. 15, the electrode pairs A1, A2, A3, ..., An are formed to correspond to the individual electrodes D1, D2, D3, ..., Dn, and the electrode spaces P1, P2, P3, ..., Pn are arrayed in a line inside of the adjacent layer 12 made of the electro-optic material. By way of example, the size of the individual electrodes D1, D2, D3, ..., Dn is approximately (0.05~0.1)×(2~5) mm, and the distance therebetween is within the range of approximately 100 μm to 200 μm.

Figure 16:
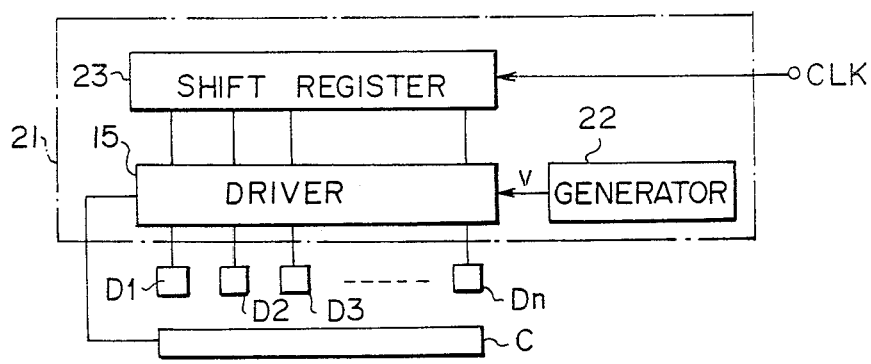
FIG. 16 is a block diagram showing the electric circuit in the embodiment of FIG. 14, FIGS. 17 and 18 are sectional side views showing further embodiments of the light beam scanning apparatus in accordance with the present invention.

FIG. 16 shows the drive circuit 21 for the embodiment of FIG. 14, which is operated in the same manner as described with reference to the embodiment of FIG. 4.

In the embodiment of FIG. 14, since the individual electrodes D1, D2, D3, ..., Dn and the common electrode C are positioned to sandwich the wave guide layer 11 and the adjacent layer 12, it is possible to make sufficiently small the distance between the individual electrodes D1, D2, D3, ..., Dn and the common electrode C by decreasing the thicknesses of the wave guide layer 11, the adjacent layer 12, and the insulating layers 25 and 19. When the distance between the individual electrodes D1, D2, D3, ..., Dn and the common electrode C is made small, it becomes possible to decrease the voltage applied to the electrode pairs A1 A2, A3, ..., An for changing the refractive index of the adjacent layer 12 by a predetermined value, i.e. for applying a predetermined electric field to the electrode spaces P1, P2, P3, ..., Pn. On the other hand, the sizes of the individual electrodes D1, D2, D3, ..., Dn defining the area of the section at which scanning light is radiated out of the stack 13 may be made large as desired regardless of the distance between the electrodes. By way of example, in the case where the sizes of the individual electrodes D1, D2, D3, ..., Dn are approximately 0.1×5 mm and the distance between the individual electrodes D1, D2, D3, ..., Dn and the common electrode C is several tens of microns, a voltage of approximately 100 V may be applied to the electrode pairs A1 A2, A3, ..., An for taking the scanning light 14 out of the stack 13.

Further, since the individual electrodes D1, D2, D3, ..., Dn may be made large and the areas of the electrode spaces P1, P2, P3, ..., Pn corresponding to the scanning light take-up sections from the stack 13 may be made wide, it is possible to maintain the scanning light take-up efficiency high even though the width of the wave guide of the guided laser beam 14 is adjusted large to decrease the energy density of the guided laser beam 14.

Figure 17:
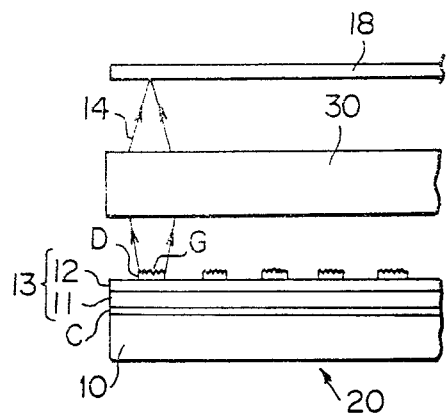
Figure 18:
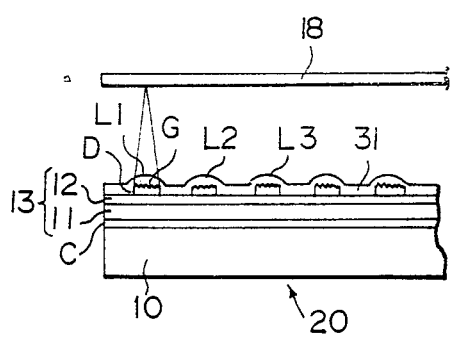

FIGS. 17 and 18 show modified forms of the embodiment of FIG. 14, wherein the lens array 30 or the lens array layer 31 is used as described with reference to FIGS. 6 and 7.

In the embodiments of FIGS. 14, 17 and 18, the substrate 10 may be omitted so that the wave guide layer 11 or the insulating layer 19 is exposed to ambient atmosphere, or the adjacent layer 12 may be overlaid on the two surfaces of the wave guide layer 11 as described above.

Further embodiments of the light beam scanning apparatus in accordance with the present invention will hereinafter be described with reference to FIGS. 19 to 23. In these embodiments, the wave guide layer and/or the adjacent layer is made of an electro-optic material, a plurality of electrodes are positioned in spaced relation to each other at said wave guide layer and/or the adjacent layer along the optical path of the wave guided inside of the wave guide layer, dielectric gratings are positioned on the surface of said adjacent layer at sections corresponding to the spaces between said electrodes, and the drive circuit sequentially and selectively applies an electric field between two adjacent electrodes among said plurality of electrodes.

Figure 19:
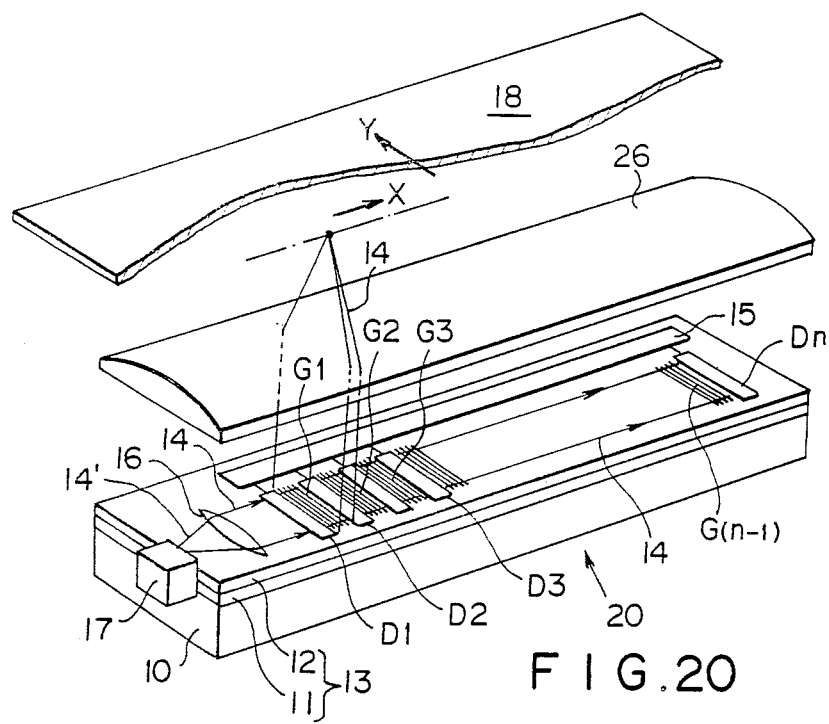
FIG. 19 is a perspective view showing another embodiment of the light beam scanning apparatus in accordance with the present invention.
Figure 20:
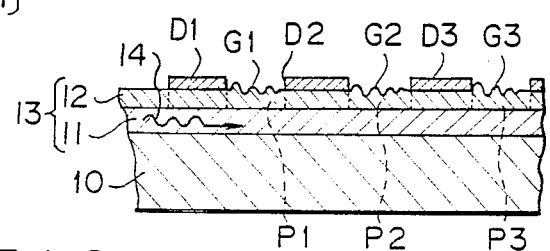
FIG. 20 is a sectional side view showing the major part of the embodiment of FIG. 19.

Referring to FIGS. 19 and 20, elongated electrodes D1, D2, D3, ..., Dn are arrayed in a line in spaced relation to each other on the surface of the adjacent layer 12. Also, dielectric gratings G1, G2, G3, ..., G(n−1) are positioned on the surface of the adjacent layer 12 at sections between the electrodes D1, D2, D3, ..., Dn. By way of example, the sizes of the electrodes D1, D2, D3, ..., Dn are within the range of (0.05~0.2 mm)×(3~5 mm), and the distance therebetween is approximately 0.2 mm. A cylindrical lens 26 for converging the light in the direction normal to the array direction of the electrodes D1, D2, D3, ..., Dn is positioned between the scanning material 18 and the stack 13.

Figure 21:
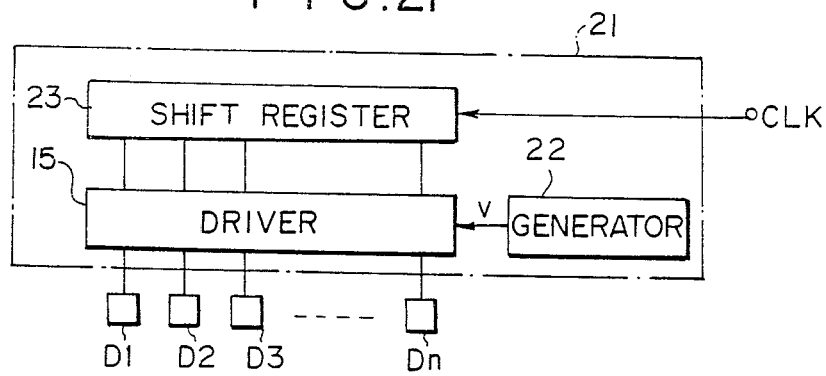
FIG. 21 is a block diagram showing the electric circuit in the embodiment of FIG. 19, FIGS. 22 and 23 are sectional side views showing further embodiments of the light beam scanning apparatus in accordance with the present invention.

FIG. 21 shows the drive circuit 21 for the embodiment of FIG. 19, which applies the voltage V generated by the voltage generating circuit 22 between a selected electrode among the electrodes D1, D2, D3, ..., Dn and the remaining electrodes thereamong via the driver 15. The driver 15 receives the output of the shift register 23 activated in synchronization with the clock signal CLK, and sequentially applies the voltage V by increasing the selected electrode one by one from the electrode D1 side. Specifically, the voltage V is first applied so that the first electrode D1 is at the potential V and the electrodes D2 to Dn are at zero potential, then applied so that the first electrode D1 and the second electrode D2 is at the potential V and the electrodes D3 to Dn are at zero potential, thereafter applied so that the first electrode D1, the second electrode D2 and the third electrode D3 are at the potential V and the electrodes D4 to Dn are at zero potential, and so on. When the electric field is applied sequentially and selectively to the electrode spaces P1, P2, P3, . . . , P(n−1) as shown in FIG. 20, the refractive index of the adjacent layer 12 at which the electric field is applied increases. As a result, the laser beam 14 is radiated from the wave guide layer 11 to the adjacent layer 12 sequentially at sections corresponding to the electrode spaces P1, P2, P3, . . . , P(n−1), and is radiated out of the adjacent layer 12 by the diffracting action of the dielectric gratings G1, G2, G3, . . . , G(n−1).

In the embodiment of FIG. 19, the dielectric gratings G1, G2, G3, . . . , G(n−1) are fabricated as converging dielectric gratings for converging the laser beam 14 in the advance direction of the laser beam 14 guided inside of the wave guide layer 11, and the cylindrical lens 26 for converging the laser beam 14 in the direction normal to the laser beam advance direction is positioned between the adjacent layer 12 and the scanning material 18. Therefore, the laser beam 14 radiated out of the dielectric gratings G1, G2, G3, . . . , G(n−1) is converted to a single point on the scanning material 18. The converging dielectric gratings are formed by positioning grid patterns side by side in the advance direction of the laser beam 14 guided inside of the wave guide layer 11 and changing the pattern pitch.

In the embodiment of FIG. 19, since the electrodes D1, D2, D3, . . . , Dn are positioned in the advance direction of the laser beam 14 guided inside of the wave guide layer 11, when the lengths of the electrodes D1, D2, D3, . . . , Dn are adjusted sufficiently long, it is possible to make the areas of the scanning light taking-out sections sufficiently large even though the distances between the electrodes are adjusted small. When the distances between the electrodes D1, D2, D3, . . . , Dn are adjusted small, it becomes possible to decrease the voltage applied for changing the refractive index of the adjacent layer 12 by a predetermined value. Further, since the electrodes D1, D2, D3, . . . , Dn may be made long, it is possible to maintain the scanning light take-up efficiency high even though the width of the light guide path for the guided laser beam 14 is adjusted large to decrease the energy density of the guided laser beam 14.

Figure 22:
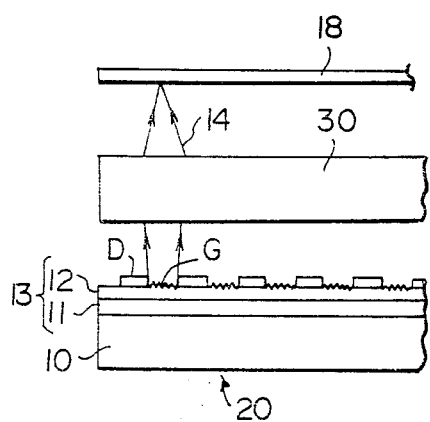
Figure 23:
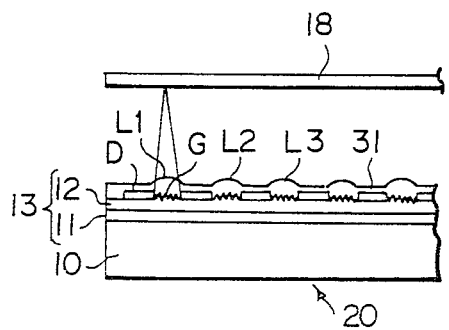

FIGS. 22 and 23 show modified forms of the embodiment of FIG. 19, wherein the lens array 30 or the lens array layer 31 is used as described with reference to FIGS. 6 and 7. It is also possible to use only the converging dielectric gratings formed by curving the grid patterns of the converging dielectric gratings described above so that they converge the laser beam 14 in two directions.

Figure 24:
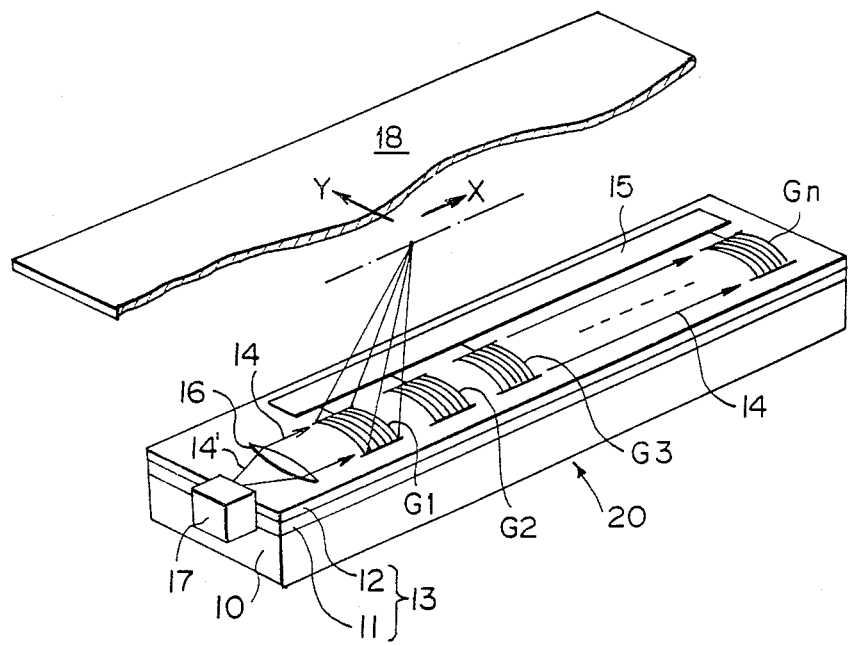
FIG. 24 is a perspective view showing a further embodiment of the light beam scanning apparatus in accordance with the present invention.

FIG. 24 shows a further embodiment of the light beam scanning apparatus in accordance with the present invention, wherein the wave guide layer and/or the adjacent layer is made of a thermo-optic material whose refractive index changes with heat, the energy application means are constituted as heat generating heads, the dielectric gratings are fabricated of a transparent electro-thermal material, which generates heat with an electric current, and are used as the heat generating heads, and the drive circuit supplies the heat generating electric current sequentially and selectively to the dielectric gratings.

In FIG. 24, the adjacent layer 12 is fabricated of a thermo-optic material. On the surface of the adjacent layer 12, dielectric gratings G1, G2, G3, . . . , Gn fabricated of a transparent electro-thermal material are arrayed in a line. As the transparent electro-thermal material, it is possible to use, for example, a material constituted by $In_2O_3$ and $SnO_2$. The sizes of the dielectric gratings G1, G2, G3, . . . , Gn may, for example, be within the range of approximately $10 \times 10$ μm to $0.2 \times 5$ mm, and the distances therebetween may be within the range of approximately 100 μm to 200 μm. The grating elements constituting each of the dielectric gratings G1, G2, G3, . . . , Gn are electrically connected to each other at two ends, and the dielectric gratings G1, G2, G3, . . . , Gn are connected to a driver 15 formed on the substrate 10.

Figure 25:
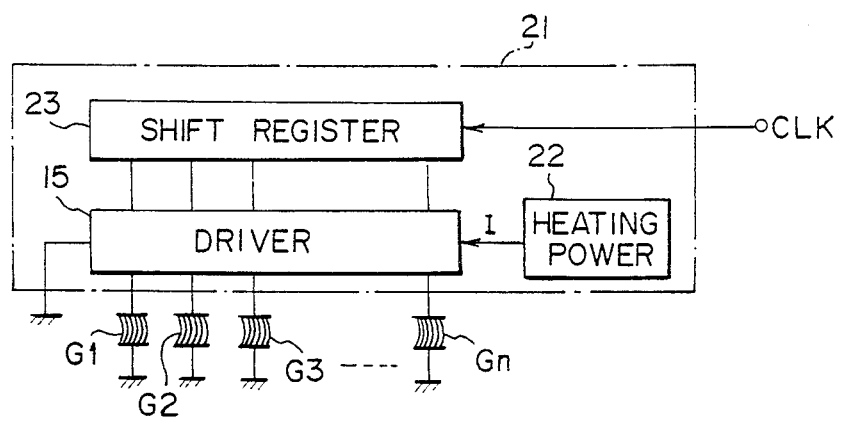
FIG. 25 is a block diagram showing the electric circuit in the embodiment of FIG. 24, FIGS. 26 and 27 are side views showing the major parts of still further embodiments of the light bea scanning apparatus in accordance with the present invention.

FIG. 25 shows the drive circuit 21 for the embodiment of FIG. 24. A current I is supplied by a heating electric power source 22 to the dielectric gratings G1, G2, G3, . . . , Gn via the driver 15. The driver 15 sequentially selects the dielectric gratings G1, G2, G3, . . . , Gn for supply of the current I one by one. Specifically, the current I is first applied to the first dielectric grating G1, then to the second dielectric grating G2, and so on. When the current I is supplied sequentially to the dielectric gratings G1, G2, G3, . . . , Gn, they sequentially generate heat. As a result, the adjacent layer 12 is heated at the section contacting the heated dielectric grating, and the refractive index of the adjacent layer 12 increases. Accordingly, the guided laser beam 14 is radiated from the wave guide layer 11 to the adjacent layer 12 at the section where the refractive index changes, and is radiated out of the adjacent layer 12 by the diffracting action of the dielectric gratings G1, G2, G3, . . . , Gn.

The embodiment of FIG. 24 may be modified to use the lens array 30 as shown in FIG. 6 or the lens array layer 31 a shown in FIG. 7.

In the embodiment of FIG. 24, since the adjacent layer and/or the wave guide layer is heated by the dielectrrc gratings at which the scanning light is taken out of the adjacent layer, the whole section where the refractive index should be changed for taking up the scanning light is heated directly and efficiently by the corresponding dielectric grating. Therefore, it is possible to minimize the energy requirement for heating. Further, since the dielectric gratings for taking the scanning light out of the adjacent layer act as the heat generating heads, the apparatus configuration becomes simple, and it becomes possible to improve reliability and reduce cost.

In a still further embodiment of the light beam scanning apparatus in accordance with the present invention, the wave guide layer is formed of a thermo-optic material in which the thermal coefficient of the refractive index is zero or negative (i.e. the refractive index does not change or decreases by heating), the adjacent layer is formed of a thermo-optic material in which the thermal coefficient of the refractive index is positive (i.e. the refractive index increases by heating) and which exhibits a refractive index smaller than that of the wave guide layer when the adjacent layer is not heated, a plurality of heating means are positioned on the surface of the adjacent layer so as to heat a plurality of heating sections along the optical path of the wave guided inside of the wave guide layer, and dielectric gratings are positioned on the surface of the adjacent layer a said heating sections. This embodiment may be constituted in the same manner as described with reference to FIGS. 24 and 25, except that the wave guide layer 11 is formed of a thermo-optic material in which the thermal coefficient of the refractive index is zero or negative, and the adjacent layer 12 is formed of a thermo-optic material in which the thermal coefficient of the refractrve index is positive. As the combination of the adjacent layer 12, the wave guide layer 11 and the substrate 10, there may be used, for example, optical glass KF9 ($+2.9\times10^{-6}/°C.$), BAK2 ($-0.1\times10^{-6}/°C.$), and FK3 ($-2.0\times10^{-6}/°C.$) supplied by Schot Company, West Germany, wherein the refractive indexes n1, n2 and n3 with respect to an He-Ne laser beam having a wavelength of 632.8 nm are respectively 1.52, 1.54 and 1.46; optical glass PK2 ($+1.4\times10^{-6}/°C.$), KF1 ($-0.4\times10^{-6}/°C.$, and FK3; optical glass BK7 ($+1.2\times10^{-6}/°C.$), BAK2 ($-0.1\times10^{-6}/°C.$), and FK3; optical glass KF9 ($+2.9\times10^{-6}/°C.$), BAK2 ($0.0\times10^{-6}/°C.$), and FK3, or the like, wherein the value in the parenthesis denotes the absolute thermal coefficient $\Delta n/\Delta T$ at $+20°$ C. to $+40°$ C. As the thermo-optic material, it is also possible to use a crystal, a plastic material, or the like insofar as the requirements for the refractive index and change in refractive index with temperature are satisfied.

This embodiment is operated in the same manner as described with reference to FIGS. 24 and 25. When the dielectric gratings G1, G2, G3, ..., Gn are sequentially heated with the current I, the adjacent layer 12 and the wave guide layer 11 are heated at the sections facing the heated dielectric grating. As a result, the refractive index of the adjacent layer 12 increases, and the refractive index of the wave guide layer 11 decreases. Since the adjacent layer 12 and the wave guide layer 11 are respectively formed of a thermo-optic material wherein the thermal coefficient of the refractive index is positive, and a thermo-optic material wherein said thermal coefficient is zero or negative, the laser beam 14 is radiated out of the adjacent layer 12 even though the layers 11 and 12 are not so much heated. Therefore, it is possible to minimize the heating energy requirement.

Figure 26:
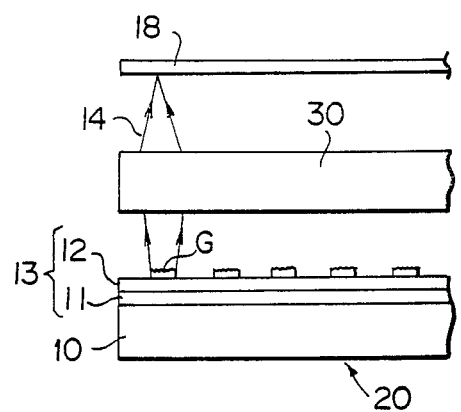
Figure 27:
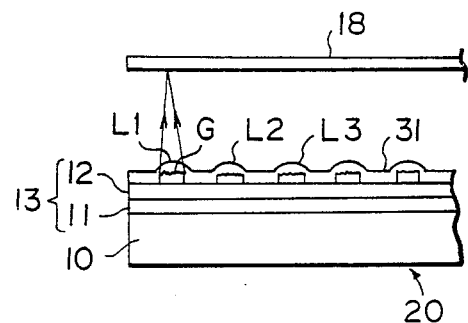

As shown in FIGS. 26 and 27, this embodiment may be modified to use the lens array 30 or the lens array layer 31 as described with reference to FIGS. 6 and 7.

In this embodiment, the wave guide layer 11 and the adjacent layer 12 are heated by the dielectric gratings G1, G2, G3, ..., Gn fabricated of the electrothermal material. However, it is also possible to heat the predetermined sections by positioning the heating means so as to sandwich the heating sections from two sides or surround them on four sides.

Figure 28:
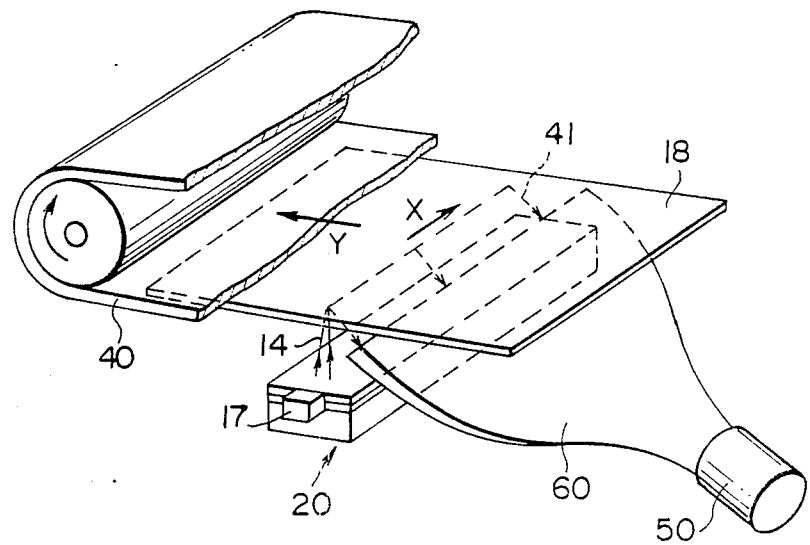
FIG. 28 is a perspective view showing an embodiment of the light beam scanning read-out apparatus in accordance with the present invention.
Figure 29:
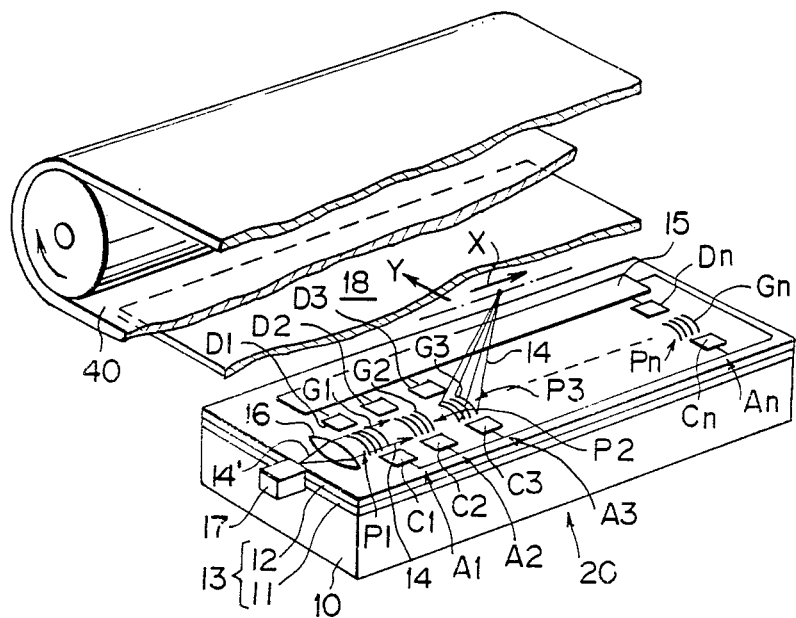
FIG. 29 is an enlarged perspective view showing a part of the embodiment of FIG. 28.
Figure 30:
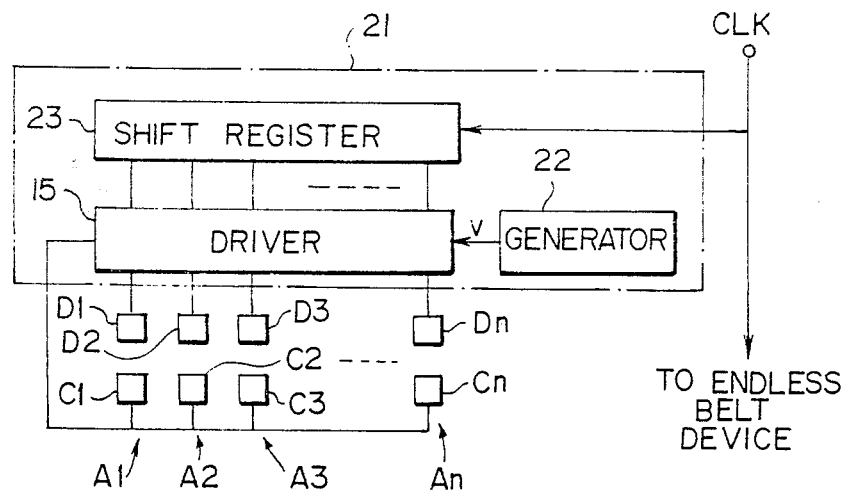
FIG. 30 is a block diagram showing the electric circuit in the embodiment of FIG. 28.

FIGS. 28 and 29 show an embodiment of the light beam scanning read-out apparatus in accordance with the present invention. As shown in FIG. 28, the light beam scanning read-out apparatus comprises a light beam scanning section 20, an endless belt device 40 acting as the subscanning means, a photomultiplier 50 acting as the photodetector, and a wave guide member 60 connected to the photomultiplier 50. FIG. 29 shows the light beam scanning section 20 by omitting the photomultiplier 50 and the wave guide member 60. The light beam scanning section 20 is constituted in the same manner as described with reference to FIG. 4. The endless belt device 40 is positioned above the adjacent layer 12 to move a read-out original 18 in the direction as indicated by the arrow Y normal to the array direction of the electrode spaces P1, P2, P3, ..., Pn FIG. 30 shows the drive circuit 21 for the light beam scanning section 20, which is operated in the same manner as described with reference to FIG. 5. In this embodiment, while the scanning in the main scanning direction is conducted as described above, the endless belt device 40 is operated in synchronization with the main scanning, and the original 18 is moved in the sub-scanning direction as indicated by the arrow Y in FIG. 28. As a result, the original 18 is two-dimensionally scanned by the laser beam 14.

The original 18 may, for example, be a stimulable phosphor sheet as disclosed in U.S. Pat. Nos. 4,258,264 and 4,387,428. The stimulable phosphor sheet 18 is exposed in advance to a radiation passing through an object to have a radiation image of the object stored thereon. As shown in FIG. 28, when the stimulable phosphor sheet 18 carrying the radiation image stored thereon is exposed to the laser beam 14, light 41 is emitted by the exposed portion of the stimulable phosphor sheet 18 in proportion to the radiation energy stored. The emitted light 41 is guided inside of the wave guide member 60 and photoelectrically detected by the photomultiplier 50. The output signal of the photomultiplier 50 is processed and sent to an image reproducing apparatus (not shown) for use in reproduction of the radiation image.

The light beam scanning read-out apparatus in accordance with the present invention may also be constituted to scan the original with light, photoelectrically detecting light reflected by the original or light passing through the object, and reading out the original image. Instead of the endless belt device 40, a rotatable drum or the like may be used as the sub-scanning means. The sub-scanning means may also be of the type moving the light scanning section along the surface of the original standing still. In the embodiment of FIG. 28, since the light scanning section is constituted by the simple stack 13 including no mechanical operating section, it is possible to move the light beam scanning section easily. Also, the photodetector is not limited to the photomultiplier 50, and may be any known photodetector such as a photodiode array. Further, the light beam scanning read-out apparatus in accordance with the present invention may be fabricated so that the energy application sections like the electrode spaces P1, P2, P3, ..., Pn are arrayed in a plurality of lines. In this case, it becomes possible to read out a color original by color separation by, for example, combining R, G and B color filters or light sources emitting different color light for the respective lines of the energy application sections.

An embodiment of the light beam scanning recording apparatus in accordance with the present invention may be constituted by replacing the read-out original 18 in FIG. 29 by a light-sensitive material. Of course, in this embodiment of the light beam scanning recording apparatus, the photomultiplier 50 and the wave guide member 60 are not used. FIG. 31 shows a control circuit for the embodiment of the light beam scanning recording apparatus wherein the drive circuit 21 for the light beam scanning section 20 is included. In FIG. 31, a driver 24 for the semiconductor laser 17 is controlled by a modulation circuit 26, and the laser beam 14' emitted by the semiconductor laser 17 as shown in FIG. 29 is modulated with an image signal S. In this manner, an image which the image signal S represents is recorded on one main scanning line on the light-sensitive material 18. At this time, the modulation timing is controlled by the clock signal CLK and synchronized with the timing of the light beam scanning. While the scanning in the main scanning direction is conducted as described above, the endless belt device 40 is operated in synchronization with the scanning in the main scanning direction by use of the clock signal CLK, and the light-sensitive material 18 is moved in the sub-scanning direction as indicated by the arrow Y in FIG. 29. In this manner, the image which the image signal S represents is two-dimensionally recorded on the light-sensitive material 18.

In the case where a continuous tone image is recorded, modulation of the laser beam 14' may be conducted by the known light intensity modulation. Or, the laser beam 14' may be emitted pulsewise, and the pulse number modulation or pulse width modulation may be conducted. In order to modulate the laser beam 14 scanning the light-sensitive material 18, instead of directly modulating the semiconductor laser 17 as described above, a light modulator such as an EOM (electro-optic modulator) or an AOM (acousto-optic modulator) may be positioned between the semiconductor laser 17 and the wave guide layer 11, and the laser beam 14' may be modulated by the light modulator.

In the light beam scanning recording apparatus of the present invention, the scanning light may also be modulated while the intensity of the light impinging upon the wave guide layer 11 is maintained constant. FIG. 32 shows the control circuit for such an embodiment of the light beam scanning recording apparatus in accordance with the present invention. In FIG. 32, the voltage generating circuit 22 generates a pulsewise voltage V which is applied between a selected pair of the individual electrodes D1, D2, D3, ..., Dn and the common electrodes C1, C2, C3, ..., Cn. Accordingly, the laser beam 14 is radiated pulsewise out of the adjacent layer 12 at the respective dielectric gratings G1, G2, G3, ..., Gn, and the respective scanning points on the light-sensitive material 18 are scanned by the pulsewise laser beam 14. The voltage generating circuit 22 is controlled by the modulation circuit 25 so that the number o width of the voltage pulses is changed in accordance with the image signal S at the respective electrode pairs A1, A2, A3, ..., An. Therefore, the number or width of pulses of the laser beam 14 scanning the light-sensitive material 18 is changed at respective scanning points (picture elements), and a continuous tone image is recorded on the light-sensitive material 18. The modulation of this type is also applicable to the case where a black and white two-valued image is recorded. Specifically, when the drive voltage supplied by the voltage generating circuit 22 to the driver 15 is turned on and off in accordance with the image signal S, no voltage is applied to predetermined electrode pairs among the electrode pairs A1, A2, A3, ..., An even though the individual electrodes D1, D2, D3, ..., Dn are sequentially selected for voltage application by use of the signal sent from the shift register 23. Accordingly, laser beam radiation from the wave guide layer 11 to the adjacent layer 12 is controlled, and a two-valued image is recorded on the light-sensitive material 18.

We claim:

1. A light beam scanning apparatus which comprises:
   (i) a stack of a wave guide layer and an adjacent layer normally exhibiting a refractive index smaller than the refractive index of said wave guide layer and closely contacted with said wave guide layer, at least either one of said wave guide layer and said adjacent layer being constituted by a material whose refractive index changes by the application of electrical energy,
   (ii) a plurality of energy application means positioned on at least one of said wave guide layer and said adjacent layer along an optical path of a wave being guided inside of said wave guide layer,
   (iii) dielectric gratings positioned on the upper section of said adjacent layer at least over portions thereof corresponding to sections where electrical energy is applied by said energy application means, and
   (iv) a drive circuit for sequentially and selectively energizing said plurality of energy application means to a predetermined energy application condition, and changing the refractive index of at least one of said wave guide layer and said adjacent layer so that said guided wave is radiated out of said stack by interaction with said dielectric gratings at said sections where electrical energy is applied by said energy application means.

2. An apparatus as defined in claim 1 wherein said material is an electro-optic material whose refractive index changes with application of an electric field, said energy application means are electrode pairs, said sections where energy is applied are electrode spaces between electrodes of respective said electrode pairs, and said drive circuit is constituted to apply an electric field between the electrodes of said electrode pairs.

3. An apparatus as defined in claim 2 wherein said electrode pairs are constituted by transparent electrodes positioned on an outer surface of said adjacent layer along said optical path of said guide wave, and an electrode positioned on an outer surface of said wave guide layer to face said transparent electrodes, and said dielectric gratings are positioned on surfaces of said transparent electrodes.

4. An apparatus as defined in claim 3 wherein said dielectric gratings are converging dielectric gratings for radiating the light incident upon said adjacent layer from said wave guide layer so that the light converges.

5. An apparatus as defined in claim 3 wherein a converging optical system for converging the light radiated out of said stack is positioned outside of said stack.

6. An apparatus as defined in claim 3, wherein an insulating layer is positioned between said electrode facing said transparent electrodes and said wave guide layer.

7. An apparatus as defined in claim 6 wherein an insulating layer is positioned between said transparent electrodes and said adjacent layer.

8. An apparatus as defined in claim 1 wherein said dielectric gratings are converging dielectric gratings for radiating the light incident upon said adjacent layer from said wave guide layer so that the light converges.

9. An apparatus as defined in claim 1, wherein a converging optical ssytem for converging the light radiated out of said stack is positioned outside of said stack.

10. An apparatus as defined in claim 1 wherein an end face of said wave guide layer opposite to a input face thereof comprises a return light generation preventing means for preventing the guided wave from returning.

11. An apparatus as defined in claim 10 wherein said end face of said wave guide layer is formed obliquely with respect to said optical path of said guided wave.

12. An apparatus as defined in claim 1 wherein guided mode of said guided wave is adjusted to a mode.

13. An apparatus as defined in claim 1 wherein said material is an electro-optic material whose refractive index changes with application of an electric field, said energy application means are electrodes positioned in spaced relation to each other, said sections where energy is applied are electrode spaced between said electrodes, and said drive circuit is constituted to apply an electric field between two adjacent electrodes among said plurality of electrodes.

14. An apparatus as defined in claim 13 wherein said dielectric gratings are converging dielectric gratings for radiating the light incident upon said adjacent layer from said wave guide layer so that the light converges.

15. An apparatus as defined in claim 13 wherein a converging optical system for converging the light radiated out of said stack is positioned outside of said stack.

16. An apparatus as defined in claim 1 wherein said material is a thermo-optic material whose refractive index changes with heat, said energy application means are constituted by said dielectric gratings which are fabricated of a transparent electro-thermal material, and said drive circuit is constituted to supply a heat generating electric current sequentially and selectively to said dielectric gratings.

17. An apparatus as defined in claim 16 wherein said dielectric gratings are converging dielectric gratings for radiating the light incident upon said adjacent layer from said wave guide layer so that the light converges.

18. An apparatus as defined in claim 16 wherein a converging optical system for converging the light radiated out of said stack is positioned outside of said stack.

19. An apparatus as defined in claim 1 wherein said wave guide layer is formed of a thermo-optic material in which the thermal coefficient of the refractive index is zero or negative, said adjacent layer is formed of a thermo-optic material in which the thermal coefficient of the refractive index is positive, said energy application means are heating means positioned on the surface of said adjacent layer.

20. An apparatus as defined in claim 19 wherein said dielectric gratings are converging dielectric gratings for radiating the light incident upon said adjacent layer from said wave guide layer so that the light converges.

21. An apparatus as defined in claim 19 wherein a converging optical system for converging the light radiated out of said stack is positioned outside of said stack.

22. A light beam scanning read-out apparatus which comprises:
(i) a stack of a wave guide layer and an adjacent layer normally exhibiting a refractive index smaller than the refractive index of said wave guide layer and closely contacted with said wave guide layer, at least either one of said wave guide layer and said adjacent layer being constituted by a material whose refractive index changes by the application of electrical energy,
(ii) a plurality of energy application means positioned on at least one of said wave guide layer and said adjacent layer along an optical path of a wave being guided inside of said wave guide layer,
(iii) dielectric gratings positioned on the upper section of said adjacent layer at least over portions thereof corresponding to sections where electrical energy is applied by said energy application means,
(iv) a light source for emitting light into said wave guide layer so that said light advances along said arrayed section where electrical energy is applied by said energy application means,
(v) a drive circuit for sequentially and selectively energizing said plurality of energy application means to a predetermined energy application condition, and changing the refractive index of at least one of said wave guide layer and said adjacent layer so that said guided wave is radiated out of said stack by interaction with said gratings at said sections where electrical energy is applied by said energy application means,
(vi) a sub-scanning means for moving a read-out original, said read-out original positioned so that said light radiated out of said stack impinges thereupon, with respect to said stack in a direction approximately normal to the array direction of said sections where electrical energy is applied by said energy application means, and
(vii) a photodetector for photoelectrically detecting light coming from said original.

23. An apparatus as defined in claim 22 wherein said material is an electro-optic material whose refractive index changes with application of an electric field, said energy application means are electrode pairs, said sections where energy is applied are electrode spaces between electrodes of respective said electrode pairs, and said drive circuit is constituted to apply an electric field between the electrodes of said electrode pairs.

24. An apparatus as defined in claim 22 wherein said dielectric gratings are converging dielectric gratings for radiating the light incident upon said adjacent layer from said wave guide layer so that the light converges.

25. An apparatus as defined in claim 22, wherein a converging optical system for converging the light radiated out of said stack is positioned outside of said stack.

26. A light beam scanning recording apparatus which comprises:
(i) a stack of a wave guide layer and an adjacent layer normally exhibiting a refractive index smaller than the refractive index of said wave guide layer and closely contacted with said wave guide layer, at least either one of said wave guide layer and said adjacent layer being constituted by a material whose refractive index changes by the application of electrical energy,
(ii) a plurality of energy application means positioned on at least one of said wave guide layer and said adjacent layer along an optical path of a wave being guided inside of said wave guide layer,
(iii) dielectric gratings positioned on the upper section of said adjacent layer at least over portions thereof corresponding to section where electrical energy is applied by said energy application means,
(iv) a light source for emitting light into said wave guide layer so that the wave advances along said arrayed sections where electrical energy is applied by said energy application means,
(v) a drive circuit for sequentially and selectively energizing said plurality of energy application means to a predetermined energy application condition, and changing the refractive index of at least one of said wave guide layer and said adjacent layer so that said guided wave is radiated out of said stack by interaction with said dielectric gratings at said sections where energy is applied by said energy application means, (vi) a sub-scanning means for moving a light-sensitive material, said light-sensitive material positioned so that said wave radiated out of said stack impinges thereupon, with respect to said stack in a direction approximately normal to the array direction of said sections where electrical energy is applied by said energy application means, and (vii) a modulation measn for modulating said light with an image signal.

27. An apparatus as defined in claim 26 wherein said material is an electro-material whose refractive index changes with application of an electric field, said energy application means are electrode pairs, said sections where energy is applied are electrode spaces between electrodes of respective said electrode pairs, and said drive circuit is constituted to apply an electric field between the electrodes of said electrode pairs.

28. An apparatus as defined in claim 27 wherein said modulation means is a modulation circuit for modulating said electric field pulsewise and changing one of the width or number of the pulses at respective electrode pairs in accordance with said image signal.

29. An apparatus as defined in claim 26 wherein said modulation means is a light modulator for modulating the light incident on said wave guide layer from said light source.

30. An apparatus as defined in claim 26 wherein said dielectric gratings are converging dielectric gratings for radiating the light incident upon said adjacent layer from said wave guide layer so that the light converges.

31. An apparatus as defined in claim 26 wherein a converging optical system for converging the light radiated out of said stack is positioned outside of said stack.

* * * * *